(12) United States Patent
Chan et al.

(10) Patent No.: US 7,889,680 B2
(45) Date of Patent: Feb. 15, 2011

(54) MERGING ANONYMOUS ROUTERS IN END-TO-END NETWORK TOPOLOGY INFERENCE

(75) Inventors: Shueng-Han Gary Chan, Kowloon (HK); Xing Jin, Kowloon (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 562 days.

(21) Appl. No.: 11/850,151

(22) Filed: Sep. 5, 2007

(65) Prior Publication Data

US 2008/0056163 A1 Mar. 6, 2008

Related U.S. Application Data

(60) Provisional application No. 60/842,083, filed on Sep. 5, 2006.

(51) Int. Cl.
*G08C 15/00* (2006.01)
(52) U.S. Cl. .................................................... 370/255
(58) Field of Classification Search ................ 370/203, 370/254–258; 709/223, 224
See application file for complete search history.

(56) References Cited

U.S. PATENT DOCUMENTS

| | | | | |
|---|---|---|---|---|
| 6,205,122 | B1 * | 3/2001 | Sharon et al. | 370/254 |
| 7,292,541 | B1 * | 11/2007 | C S | 370/254 |
| 2006/0153099 | A1 * | 7/2006 | Feldman et al. | 370/254 |
| 2006/0209717 | A1 * | 9/2006 | Sharma et al. | 370/254 |

OTHER PUBLICATIONS

Malkin "Traceroute Using an IP Option", IETF RFC 1393 (Jan. 1993).
J.B. Tenenbaum et al., "A global geometric framework for nonlinear dimensionally reduction", Science, vol. 290, pp. 2319-2323 (Dec. 2000).

* cited by examiner

*Primary Examiner*—Ayaz R Sheikh
*Assistant Examiner*—Blanche Wong
(74) *Attorney, Agent, or Firm*—Schwabe, Williamson & Wyatt

(57) ABSTRACT

Algorithms are described that facilitate the inference of a network topology by estimating router co-ordinates and merging anonymous routers. The algorithms have practical applications in the inference of a network topology as part of the provision of a network service that is based on the underlying topology and where knowledge of the actual topology allows improved performance.

19 Claims, 16 Drawing Sheets

A) ACTUAL TOPOLOGY

B) AN INFERRED TOPOLOGY FROM TRACEROUTE RESULTS

TABLE I

AN EXAMPLE OF TRACEROUTE RESULT WITH ANONYMOUS ROUTERS

| >traceroute www.sohu.com | | | | |
|---|---|---|---|---|
| traceroute to pagegrp1.sohu.com (61.135.131.182), 30 hops max, 40 byte packets | | | | |
| No. | Router Name/IP Address | Exp 1 | Exp 2 | Exp 3 |
| 1 | gw10 (143.89.43.254) | 0.899 ms | 0.577 ms | 0.525 ms |
| 2 | fedscr3.ust.hk (202.40.138.121) | 1.087 ms | 1.335 ms | 1.040 ms |
| 3 | * * * | | | |
| 4 | 202.40.217.69 (202.40.217.69) | 12.543 ms | 7.427 ms | 14.692 ms |
| 5 | 202.40.217.130 (202.40.217.130) | 8.004 ms | 6.981 ms | 9.032 ms |
| 6 | 134.159.124.193 (134.159.124.193) | 13.207 ms | 7.085 ms | 11.309 ms |
| 7 | i-5-2.tmh-dist02.net.reach.com (202.84.153.82) | 16.756 ms | 12.531 ms | 12.278 ms |
| . | . . . | . . . | . . . | . . . |

A) ACTUAL TOPOLOGY

B) AN INFERRED TOPOLOGY FROM TRACEROUTE RESULTS

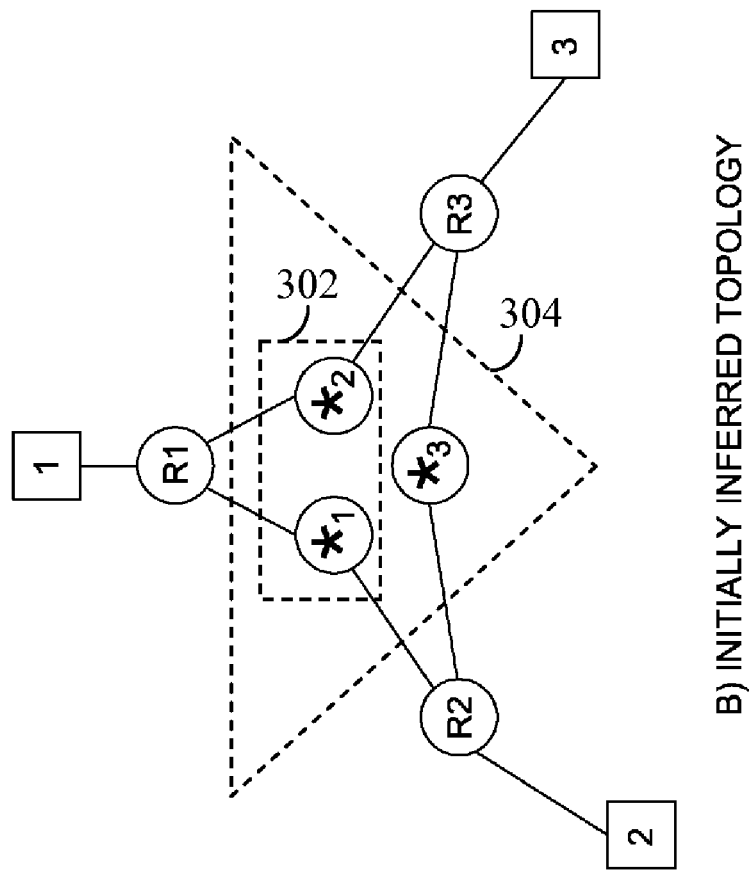
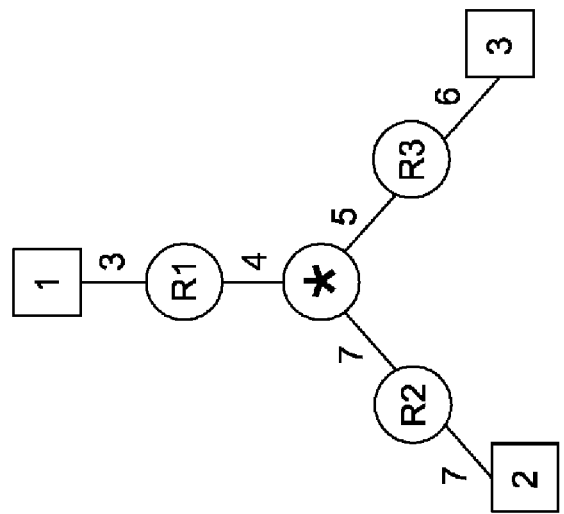
FIG. 3

TABLE II
DELAY INFORMATION FROM TRACEROUTE RESULTS (UNIT: MS)

| Src-Dest | ROUTER-LEVEL PATH | DELAY MEASURED IN TRACEROUTE | DELAY COMPUTED FROM TRACEROUTE | DELAY ASSOCIATED WITH ANONYMOUS ROUTERS |
|---|---|---|---|---|
| 1-2 | 1 - $R_1$ - $\star_1$ - $R_2$ - 2 | $d(1, R_1) = 3$, $d(1, R_2) = 14$, $d(1, 2) = 21$ | $d(R_1, R_2) = 11$, $d(R_1, 2) = 18$, $d(R_2, 2) = 7$ | $d(R_1, \star_1) = d(\star_1, R_2) = 5.5$, $d(1, \star_1) = 8.5$, $d(\star_1, 2) = 12.5$ |
| 1-3 | 1 - $R_1$ - $\star_2$ - $R_3$ - 3 | $d(1, R_1) = 3$, $d(1, R_3) = 12$, $d(1, 3) = 18$ | $d(R_1, R_3) = 9$, $d(R_1, 3) = 15$, $d(R_3, 3) = 6$ | $d(R_1, \star_2) = d(\star_2, R_3) = 4.5$, $d(1, \star_2) = 7.5$, $d(\star_2, 3) = 10.5$ |
| 2-3 | 2 - $R_2$ - $\star_3$ - $R_3$ - 3 | $d(2, R_2) = 7$, $d(2, R_3) = 19$, $d(2, 3) = 25$ | $d(R_2, R_3) = 12$, $d(R_2, 3) = 18$, $d(R_3, 3) = 6$ | $d(R_2, \star_3) = d(\star_3, R_3) = 6$, $d(2, \star_3) = 13$, $d(\star_3, 3) = 12$ |

FIG. 4

TABLE III
DISTANCE MATRIX G

|   | 1 | 2 | 3 | $R_1$ | $R_2$ | $R_3$ | $\star_1$ | $\star_2$ | $\star_3$ |
|---|---|---|---|---|---|---|---|---|---|
| 1 | 0 | 21 | 18 | 3 | 14 | 12 | 8.5 | 7.5 | $\infty$ |
| 2 | 21 | 0 | 25 | 18 | 7 | 19 | 12.5 | $\infty$ | 13 |
| 3 | 18 | 25 | 0 | 15 | 18 | 6 | $\infty$ | 10.5 | 12 |
| $R_1$ | 3 | 18 | 15 | 0 | 11 | 9 | 5.5 | 4.5 | $\infty$ |
| $R_2$ | 14 | 7 | 18 | 11 | 0 | 12 | 5.5 | $\infty$ | 6 |
| $R_3$ | 12 | 19 | 6 | 9 | 12 | 0 | $\infty$ | 4.5 | 6 |
| $\star_1$ | 8.5 | 12.5 | $\infty$ | 5.5 | 5.5 | $\infty$ | 0 | $\infty$ | $\infty$ |
| $\star_2$ | 7.5 | $\infty$ | 10.5 | 4.5 | $\infty$ | 4.5 | $\infty$ | 0 | $\infty$ |
| $\star_3$ | $\infty$ | 13 | 12 | $\infty$ | 6 | 6 | $\infty$ | $\infty$ | 0 |

FIG. 5

TABLE IV
DISTANCE MATRIX G'

|   | 1 | 2 | 3 | $R_1$ | $R_2$ | $R_3$ | $\star_1$ | $\star_2$ | $\star_3$ |
|---|---|---|---|---|---|---|---|---|---|
| 1 | 0 | $\infty$ | $\infty$ | 1 | $\infty$ | $\infty$ | $\infty$ | $\infty$ | $\infty$ |
| 2 | $\infty$ | 0 | $\infty$ | $\infty$ | 1 | $\infty$ | $\infty$ | $\infty$ | $\infty$ |
| 3 | $\infty$ | $\infty$ | 0 | $\infty$ | $\infty$ | 1 | $\infty$ | $\infty$ | $\infty$ |
| $R_1$ | 1 | $\infty$ | $\infty$ | 0 | $\infty$ | $\infty$ | 1 | 1 | $\infty$ |
| $R_2$ | $\infty$ | 1 | $\infty$ | $\infty$ | 0 | $\infty$ | 1 | $\infty$ | 1 |
| $R_3$ | $\infty$ | $\infty$ | 1 | $\infty$ | $\infty$ | 0 | $\infty$ | 1 | 1 |
| $\star_1$ | $\infty$ | $\infty$ | $\infty$ | 1 | 1 | $\infty$ | 0 | $\infty$ | $\infty$ |
| $\star_2$ | $\infty$ | $\infty$ | $\infty$ | 1 | $\infty$ | 1 | $\infty$ | 0 | $\infty$ |
| $\star_3$ | $\infty$ | $\infty$ | $\infty$ | $\infty$ | 1 | 1 | $\infty$ | $\infty$ | 0 |

FIG. 6

MERGING ANONYMOUS ROUTERS IN END-TO-END NETWORK TOPOLOGY INFERENCE

CROSS-REFERENCE TO RELATED APPLICATIONS

This application claims priority to U.S. Provisional Application Ser. No. 60/842,083, filed on Sep. 5, 2006, which is hereby incorporated by reference herein in its entirety.

FIELD OF THE INVENTION

This invention relates to methods of inferring a network topology, and in particular to methods of merging anonymous routers when carrying out an end-to-end network topology process.

BACKGROUND OF THE INVENTION

With the rapid growth of the Internet overlay networks have been increasingly used to deploy network services. Examples of such services include application-layer multicast (ALM) services, peer-to-peer to file sharing and overlay path routing services. However, to provide such services to a high standard it is important to know the topology of the underlying network. For example, in the case of ALM services it has been shown that topology-aware ALM can achieve substantially lower end-to-end delay, low physical link stress and high-tree bandwidth.

Various methods have been proposed to infer the topology of an underlying network. In particular, traceroute-like tools are often used to extract router-level path information between a pair of hosts. Traceroute is a widely used and well-defined measurement tool in the Internet. The specification of traceroute is defined in G. Malkin, "Traceroute Using an IP Option", IETF RFC 1393 (January 1993), available at filing from http://www.ietforg/rfc/rfc1393.txt?number=1393. Traceroute is implemented using ICMP (Internet Control Message Protocol) messages that are sent from a source to a destination. The source transmits to a destination an IP datagram with a certain TTL (time-to-live) value and each router that handles the datagram is required to decrement the TTL value by one. When a router receives an IP datagram whose TTL is 1, the datagram is thrown away and the router returns an ICMP "time exceeded" error message back to the source. This error message includes the router name, router IP address and round-trip-time (RTT) to the source. The source therefore sends out to the destination a succession of IP datagrams with increasing TTL values and each datagram can identify one router in the path. In addition, if the datagram arrives at the destination with an unused port number (usually larger than 30,000) the destination's host UDP module generates an ICMP "port unreachable" error message that is returned to the source. Using these return messages the router-level path can be identified.

However, some routers process ICMP messages differently from each other. Some do not return ICMP error messages at all and consequently such routers appear as unknown and are conventionally indicated by the symbol "*" in the traceroute results. Other routers may return ICMP error messages only when their workload is light such that on some occasions the router appears in the traceroute results as a normal router, while on other occasions the router is unknown. Other routers may simply discard the ICMP messages and therefore all subsequent routers in the path appear as unknown. In this application routers that do not return ICMP messages at all are referred to as "type-1 routers", routers that return ICMP messages only when their loading is light are referred to as "type-2 routers", and routers that simply discard ICMP messages are referred to as "type-3 routers".

Traceroute results therefore provide details of router with known IP addresses and these are conventionally called known routers. Unknown routers without an explicit IP address are referred to as anonymous routers.

FIG. 1 shows in Table I an example of typical traceroute results obtained from three experimental trials conducted from a server at The Hong Kong University of Science and Technology with www.sohu.com as the destination. The names, IP addresses and round-trip delays (including transmission delay, propagation delay, router processing delay and queuing delay) of the intermediate routers are all shown, but it will be seen that the third router is an anonymous router about which no information is known other than its presence in the path.

Topologies can be inferred from such traceroute results. To infer an underlying topology from traceroute results each occurrence of an anonymous router can be considered to be unique (ie each anonymous router corresponds to a different router) however this leads to high inflation of anonymous routers in the resulting inferred topology. This can be seen from the example of FIG. 2(a) that shows an example of an actual path topology. Here hosts are labeled as 1, 2, 3 and 4. $R_1$ is a known router while $*_1$ and $*_2$ are anonymous routers of the type that never return time exceeded error messages. FIG. 2(b) shows the topology that is inferred with pair-wise traceroutes among the four-hosts assuming the paths are symmetric. It will be seen that the two actual anonymous routers become nine anonymous routers in the inferred topology.

Various proposals have therefore been made in the past to reduce this problem by merging anonymous routers in inferred topologies while meeting a number of consistency requirements, including: (a) trace preservation, the inferred topology should agree with all the traceroute paths; and (b) distance preservation, the length of the shortest paths between two nodes in the inferred topology should not be shorter than the traceroute results. Such prior proposals have however been found to be very complex to implement and require very high computational complexity.

SUMMARY OF THE INVENTION

According to the present invention there is provided a method of inferring a network topology from traceroute results, comprising the steps of (a) estimating router co-ordinates, and (b) merging anonymous routers.

In preferred embodiments of the invention step (a) comprises collecting and analyzing round-trip delays from the traceroute results, and using the Isomap algorithm to embed routers in a high-dimensional Euclidean space. The round-trip delays may be defined in terms of round-trip time (and preferably anonymous routers are assumed to be evenly distributed between known neighbors) or round-trip delays may be defined in terms of hop numbers.

In the context of this specification the term "Isomap" refers to the tool developed by Stanford University, described in J. B. Tenenbaum et al., "A global geometric framework for nonlinear dimensionally reduction", *Science*, Vol. 290, pp. 2319-2323 (December 2000), which is hereby incorporated by reference herein in its entirety, and found at filing at http://isomap.stanford.edu.

Preferably prior to estimating router co-ordinates a preliminary router merging is performed in which two anonymous routers or one anonymous router and one known router are merged if they share the same neighbors.

In one embodiment of the invention in step (b) two anonymous routers are merged if they are separated by a predefined distance. Alternatively two anonymous routers may be merged if they share one known neighbor and are within a predefined distance.

According to another aspect of the present invention there is provided a method of inferring a network topology from traceroute results, comprising merging pairs of anonymous routers that share at least one known neighbor and do not appear in the same traceroute path. This method may be repeated iteratively until no further pairs of anonymous routers can be merged.

According to the present invention there is further provided a method of providing an application layer service on an underlying network, including inferring a network topology from traceroute results by means of a method comprising the steps of (a) estimating router co-ordinates, and (b) merging anonymous routers.

According to the present invention there is still further provided a method of providing an application layer service on an underlying network, including inferring a network topology from traceroute results, comprising merging pairs of anonymous routers that share at least one known neighbor and do not appear in the same traceroute path.

BRIEF DESCRIPTION OF THE DRAWINGS

Some examples of the invention will now be described by way of example and with reference to the accompanying drawings, in which:

FIGS. 2(a) and (b) show examples of (a) an actual topology and for comparison (b) a corresponding topology inferred according to prior art techniques, FIGS. 3(a) and (b) show examples of (a) an actual topology and for comparison (b) an inferred topology, FIG. 4 shows a table with example delay information from traceroute results, FIG. 5 shows a table with an example of a distance matrix in one embodiment of the invention, FIG. 6 shows a table with an example of a distance matrix in another embodiment of the invention, FIG. 7 plots simulated example results of the invention on generated topologies, and FIG. 8 plots simulated example results of the invention on real Internet topologies.

DETAILED DESCRIPTION OF PREFERRED EMBODIMENTS

Figures 1, 2:
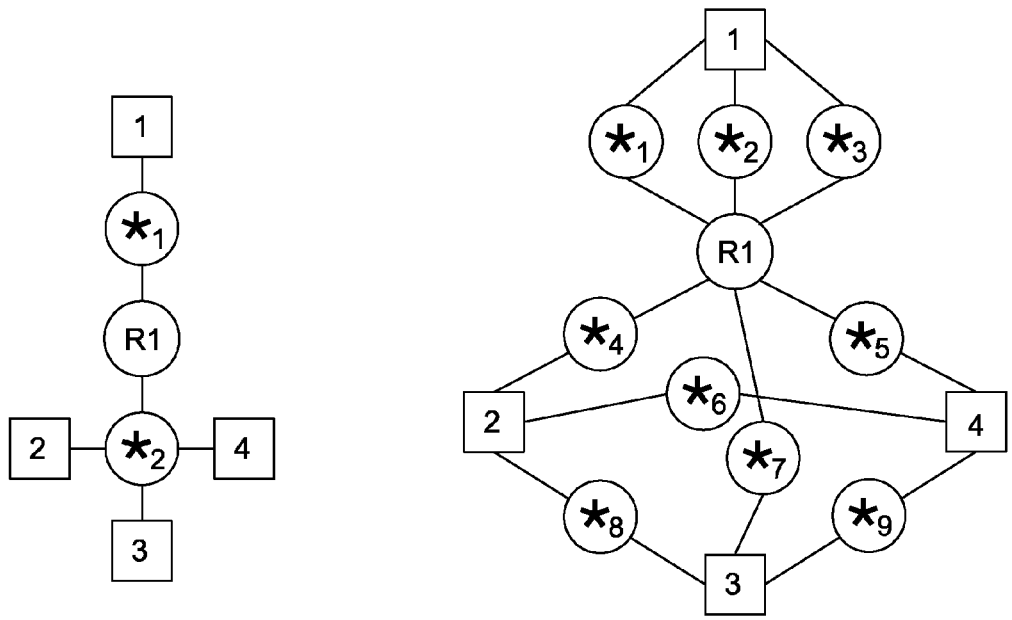
FIG. 1 shows a table with example traceroute results.

Before describing in detail some embodiments of the invention, first it will be shown that traditional approaches that keep the distance and trace consistencies have high computational complexities and are not practical for even a medium-sized network with hundreds of routers. To reduce the complexity, in embodiments of the present invention these constraints are relaxed and two fast algorithms are proposed.

As anonymous routers greatly inflate the topology, the following problem is considered: Given a group of N hosts and a set of traceroute results among them, how can an inferred topology be constructed by reducing the number of anonymous routers?

As described before, there exist three types of anonymous routers and there are dealt with separately. First of all, the arc method is used to deal with routers that discard ICMP messages (i.e., type-3). See, A. Broido et al., "Internet topology: Connectivity of IP graphs", in *Proc. SPIE ITCom '01* (August 2001), which is hereby incorporated by reference herein in its entirety. Suppose a traceroute path from host A to host B contains a type-3 router $*_x$. All the routers following $*_x$ in the traceroute path must be "*". Denote the router directly before $*_x$ as X. First check whether traceroute from B to A has been conducted. If not, add an arc to directly connect X and B. Otherwise, the traceroute path from B to A must also contain a type-3 router $*_y$. Similarly, denote the router directly before $*_y$ as Y and add an arc to connect X and Y.

After introducing the arcs, the remaining anonymous routers in the resultant topology are of either type-1 or type-2. If it is assumed that each of the remaining anonymous routers is a unique one, the inferred topology is consistent with traceroutes but suffers high inflation of routers and links. It is therefore necessary to merge the anonymous routers.

To keep the distance and trace consistencies as in B. Yao et al., "Topology inference in the presence of anonymous routers", in *Proc. IEEE INFOCOM '03*, pp. 353-363 (April 2003), which is hereby incorporated by reference herein in its entirety, it is necessary to check whether two anonymous routers are mergeable. To do that, all the inter-host shortest paths in the topology after merging are computed and compared with traceroute results one by one. Suppose N is the number of hosts, $n_k$ is the number of known routers, and $n_i$ is the number of anonymous routers in the initially inferred topology. Computing single-source shortest paths in a graph with V vertices by the Dijkstra algorithm takes $O(V^2)$ time, i.e., $O((N+n_k+n_i)^2)$ in our topology. See, T. H. Cormen et al., "Introduction to Algorithms", MIT Press (2001), which is hereby incorporated by reference herein in its entirety. To compute all the inter-host shortest paths, the complexity is $O(N(N+n_k+n_i)^2)$. There are a total of $O(N^2)$ paths to be compared, thus the total complexity of checking one pair of anonymous routers is $O(N(N+n_k+n_i)^2+N^2)=O(N(N+n_k+n_i)^2)$. Furthermore, it has been shown that the mergeable relationship is not transitive. That is, if $*_1$ is mergeable with $*_2$, and $*_2$ is mergeable with $*_3$, it does not mean that $*_1$ is mergeable with $*_3$. An additional check between $*_1$ and $*_3$ is necessary. (See, Yao et al.) In summary, given $n_i$ anonymous routers in the topology, at least $O(n_i)$ pairs of anonymous routers need to be compared (in the worst case $O(n_i^2)$ pairs), leading to a total of at least $O(N(N+n_k+n_i)^2 n_i)$ complexity. Simulations and Internet measurements indicate that $n_k$ and $n_i$ are usually much larger than N, leading to a high check complexity. In view of this level of complexity, in order to handle large networks a possible option is to relax the consistency constraints by allowing some inconsistent merging, and in embodiments of the invention two algorithms are proposed to merge anonymous routers that reduce the calculational complexity.

In embodiments of the invention the Isomap algorithm will be used. Isomap estimates point coordinates in a multi-dimensional space given the distances between them and Isomap can be used to estimate router coordinates based on traceroute results. In this way, multiple occurrences of the same anonymous router may result in similar coordinates and can then be merged. (See, J. B. Tenenbaum et al.)

Multidimensional scaling (MDS) and principal component analysis (PCA) have been widely applied to capture the inter-correlation of high-dimensional data in low-dimensional space. PCA finds a low-dimensional embedding of data points that best preserves their variance as measured in the high-dimensional input space. Classical MDS finds an embedding that preserves the inter-point distances, which is equivalent to PCA when the distances are Euclidean. However, MDS requires the distances between all pairs of points as input. If the missing distances are simply replaced by infinity values, the accuracy of results would be seriously affected. Note that it is impossible to obtain pair-wise router distances from traceroutes, therefore MDS is not so useful here.

Isomap allows an incomplete distance matrix as input to estimate point coordinates in a multi-dimensional space. Isomap is in fact a generalized MDS method. It views the problem of high dimensionality to low dimensionality transformation as a graph problem. The Isomap algorithm consists of three steps: (1) Given a distance matrix, Isomap first constructs a neighborhood graph on top of the points. Namely, each point needs to select some points as its neighbors and adds edges to them. The neighbors can be the points within a certain distance range or a certain number of closest points. All the points hence form a connected graph; (2) Isomap then computes pair-wise shortest path distances in the neighborhood graph by the Floyd-Warshall algorithm or Dijkstra algorithm. The distance between any two points (in the neighborhood graph) is then known and a complete distance matrix is available; (3) In the final step, Isomap applies MDS to the complete distance matrix to estimate point coordinates.

In a traceroute result, the network distance between the source and an intermediate known router is available and can be expressed in terms of delays (RTT) or hops. Delay-based embedding is often more accurate than hop-based embedding, as in Costa et al., below, leading to more accurate merging. Regarding delay based embedding, see the following, each of which is incorporated herein by reference in its entirety: T. S. E. Ng et al., "Predicting Internet network distance with coordinates-based approaches", in *Proc. IEEE INFOCOM* '02, pp. 170-179 (June 2002); H. Lim et al., "Constructing Internet coordinate system based on delay measurements", in *Proc. ACM SIGCOMM IWC* '03, pp. 129-142 (October 2003); M. Costa et al., "PIC: Practical Internet coordinates for distance estimation", in *Proc. ICDCS* '04 (March 2004); F. Dabek et al., "Vivaldi: A decentralized network coordinate system", in *Proc. ACM SIGCOMM* '04, pp. 15-26 (August 2004); and B. Wong et al., "Meridian: a lightweight network location service without virtual coordinates", in *Proc. ACM SIGCOMM* '05, pp. 85-96 (August 2005). This is because the RTT between two hosts often correlates with their geographic distance, which is approximately in a 2-dimensional Euclidean space. However, delay-based embedding has the following drawbacks: (a) The link delay may not be accurate and stable, especially in heavy-loaded networks; (b) The delays associated with anonymous routers are not available from traceroutes. Therefore, their estimated coordinates are inaccurate even if the embedding of known routers and hosts is fully accurate. In the following, the delay-based Isomap merging algorithm is called the Isomap-delay algorithm, and the hop-based Isomap merging algorithm is called the Isomap-hop algorithm. In embodiments of the invention either may be chosen and they are described in the following, but before either merging algorithm is applied some initial pruning may be performed.

Initial Pruning

Check the neighbors of anonymous routers. If two anonymous routers or one anonymous router and one known router share the same neighbors (known routers or hosts), merge them directly (To check whether an anonymous router is mergeable to some known router, it is only necessary to compare the anonymous router with its neighbors' neighbors). For example, in FIG. 2(b), $*_1$ and $*_2$ lie between host 1 and router $R_1$ and they can be merged into one router. The justification for such pruning is that this merging preserves both the distance and the trace consistencies. Furthermore, in the Internet, the path segment between a pair of routers two hops away is usually stable. Therefore, this pruning works in most cases.

Following this initial pruning the distance matrix is then constructed.

Construction of Distance Matrix

The operations in the Isomap-delay and Isomap-hop algorithms must be distinguished.

Isomap-delay algorithm: Collect and analyze round-trip delays from traceroute results. In a traceroute path, the delay between any two known nodes (known routers or hosts) is either directly available or can be computed. However, the delays associated with anonymous routers are not available. Suppose A and B are two valid IP addresses in a traceroute, sandwiched by a list of anonymous routers $b_1, \ldots, b_n$, in that order. We assume that these anonymous routers are evenly distributed between A and B, and accordingly compute delay $(b_i, b_j)$ as $(j-i)/(n+1) \times \text{delay}(A,B)$, where $\text{delay}(X_1, X_2)$ is the delay between $X_1$ and $X_2$.

Suppose the total number of nodes in the inferred topology (including known and anonymous routers, and hosts) is $n_t$. We build a $n_t \times n_t$ distance matrix G as $$G(i, j) = \begin{cases} 0, & \text{if } i = j; \\ \min(d(i, j), d(j, i)), & \text{if both } d(i, j) \text{ and } d(j, i) \text{ exist}; \\ d(i, j), & \text{if only } d(i, j) \text{ exists}; \\ d(j, i), & \text{if only } d(j, i) \text{ exists}; \\ \infty, & \text{otherwise;} \end{cases}$$

where $d(i, j)$ is the minimum delay from i to j in traceroute results.

Isomap-hop algorithm: Collect network connectivity information from traceroute results, and build a symmetric $n_t \times n_t$ distance matrix G' as $$G'(i, j) = \begin{cases} 0, & \text{if } i = j; \\ 1, & \text{if } i \text{ and } j \text{ are directly connected in at least one path}; \\ \infty, & \text{otherwise;} \end{cases}$$

Coordinate Estimation

Apply Isomap to G or G' to compute the coordinates of routers and hosts. It has been shown that Internet coordinates can be approximately modeled by multi-dimensional Euclidean space. (See, Ng et al., Lim et al., Costa et al., and Dabek et al.) We hence use 5-dimensional Euclidean space in this embodiment.

Router Merging

Compute the distance between any pair of anonymous routers according to their coordinates. Merge anonymous routers as follows:

(1) Merge two anonymous routers within distance $\Delta_1$.
(2) Merge two anonymous routers that share one same neighbor (known routers or hosts) and are within distance $\Delta_2$.
(3) Do not merge two anonymous routers that appear in the same path.

$\Delta_1$ and $\Delta_2$ are two pre-defined thresholds. Clearly, a large threshold increases incorrect merging, while a small one decreases correct merging.

An example of such router merging will now be illustrated with reference to FIG. 3. FIG. 3(a) shows the actual underlay topology, which contains three hosts labeled as 1, 2 and 3, three known routers labeled as $R_1$, $R_2$ and $R_3$, and one type-1 anonymous router. The labels along lines indicate the delays of links in the unit of ms. With pair-wise traceroutes (i.e. path $1\rightarrow 2$, $1\rightarrow 3$, and $2\rightarrow 3$), we obtain an inferred topology as shown in FIG. 3(b).

Using the Isomap-delay algorithm, the delay information as shown in Table II in FIG. 4 is obtained. The third column "Delay Measured in Traceroute" shows the delays directly returned by traceroutes. The fourth column shows the delays among known routers and hosts which are computed according to router sequences in paths and the directly measured delays. The fifth column shows the delays associated with anonymous routers by assuming these anonymous routers are evenly distributed between their known neighbors.

We then construct the distance matrix G as Table III in FIG. 5 shows. Isomap takes this distance matrix as input and estimates the coordinates of $*_1$, $*_2$, and $*_3$ in 5-dimensional space as (2.36, 2.02, 0, 0, 0), (−3.58, 1.20, 0, 0, 0), (0.75, −2.19, 0, 0, 0), respectively. As a result, the distances between $*_1$ and $*_2$, $*_1$ and $*_3$, $*_2$ and $*_3$ are computed as 6.00 ms, 4.51 ms and 5.50 ms, respectively. If $\Delta_1$ is set to 10 ms, we can merge all the three anonymous routers.

Using the Isomap-hop algorithm we construct a distance matrix G' as in Table IV in FIG. 6. Applying Isomap to G', we obtain the coordinates of $*_1$, $*_2$ and $*_3$ as (0.65, −1.53, −0.75, 0.05, 0.10), (0.90, 1.02, 0.75, 0.05, −0.06) and (−1.55, 0.51, 0.75, −0.10, −0.04), respectively. The distances between $*_1$ and $*_2$, $*_1$ and $*_3$, $*_2$ and $*_3$ are 2.74, 2.64 and 2.74, respectively. With a suitable choice for $\Delta_1$ and $\Delta_2$, we may merge two or three of them.

The complexity of the algorithms can be considered, given that the time and space complexities of Isomap are $O(M^3)$ and $O(M^2)$, respectively, where M is the number of input points. First the time complexity is analyzed. In the pruning procedure, we compare all $O(n_i^2)$ pairs of anonymous routers. Each anonymous router has only two neighbors since each anonymous router is assumed to be a unique one. Therefore, the comparison of one pair takes $O(1)$ time. To handle type-2 routers, we compare each anonymous router with its neighbors' neighbors. In the worst case, we need to compare $O(n_i n_k)$ pairs of routers. Each comparison takes $O(1)$ time since each anonymous router has two neighbors (if a known router has multiple neighbors, a hashing function can be used to organize its neighbors). As a result, the whole pruning procedure takes $O(n_i^2 + n_i n_k)$ time. The construction of the distance matrix needs to process a total of $O(N^2)$ paths. We assume that the number of routers in a path does not exceed a certain constant, therefore the complexity of constructing the distance matrix is $O(N^2)$. The Isomap step takes $O((N+n_k+n_i)^3)$ time. Afterwards, it takes $O(n_i^2)$ time to compute the distances between anonymous routers and merge them. In total, the overall complexity is $O(n_i^2+n_i n_k+N^2+(N+n_k+n_i)^3+n_i^2)=O((N+n_k+n_i)^3)$.

The space complexity is analyzed as follows. The initially inferred topology contains $(N+n_k+n_i)$ nodes. The links among known routers and hosts take up at most $O((N+n_k)^2)$ storage space. The links associated with anonymous routers can be stored in $O(n_i)$ space, because each anonymous router has two neighbors and two adjacent links. So the initially inferred topology can be stored in $O((N+n_k)^2+n_i)$ space. The distance matrix, Isomap and the coordinates need at most $O((N+n_k+n_i)^2)$, $O((N+n_k+n_i)^2)$ and $O(N+n_k+n_i)$ spaces, respectively. Therefore, the total space complexity is $O((N+n_k+n_i)^2)$.

Complexity can be reduced by using a simpler algorithm, the neighbor matching algorithm, which trades off some accuracy for lower complexity. In this algorithm pairs of anonymous routers are merged if they share at least one neighbor (known router or host) and do not appear in the same traceroute path. All the anonymous router pairs are compared and the procedure repeated until no more pairs can be merged. For example, in FIG. 3(b), we merge $*_1$ and $*_2$ 302 because they have the same neighbor $R_1$. Denote this new router as $*_{12}$, which keeps all the links previously adjacent to $*_1$ or $*_2$. We proceed to merge $*_{12}$ and $*_3$ 304 since they share the same neighbors: $R_2$ and $R_3$. In this way, we finally merge all the anonymous routers together. Clearly, this approach may over-merge anonymous routers.

The time complexity of the neighbor matching algorithm is roughly analyzed in terms of the total number of router pairs compared. In the first iteration, we compare all $O(n_i^2)$ anonymous router pairs and possibly merge some of them. Suppose we merge $k_1$ pairs of routers in this iteration. In the second iteration, we only need to compare these $k_1$ newly generated routers with each other and with other routers, i.e. $O(k_1 \times k_1 + k_1 \times (n_i - k_1 - 1)) = O(k_1 \times n_i)$ pairs. Suppose there are a total of t iterations before the algorithm stops, and in each iteration, $k_1, k_2, \ldots, k_t$ pairs are merged, in that sequence. The total number of pairs that need to be compared is then $$O\left(n_i^2 + \sum_{j=1}^{t}(k_j \times n_i)\right) = O\left(n_i^2 + n_i \times \sum_{j=1}^{t} k_j\right)$$
$$\leq O(n_i^2 + n_i \times (n_i - 1))$$
$$= O(n_i^2)$$

Regarding the space complexity, observe that each merging decreases the number of routers in the topology by one and also decreases the number of links. The maximum storage space is then required for the initially inferred topology, which is $O((N+n_k)^2+n_i)$.

Simulations may be performed to evaluate the merging algorithms of embodiments of the present invention on Internet-like topologies and a real Internet topology.

1) Simulation Setup: The following metrics are defined to enable an evaluation of the performance of the merging algorithms.

Router ratio: defined as the total number of routers in an inferred topology divided by the number of routers in the actual topology.

Link ratio: defined as the total number of links in an inferred topology divided by the number of links in the actual topology.

Anonymous router ratio: defined as the number of anonymous routers in an inferred topology divided by the number of anonymous routers in the actual topology.

Error merging ratio: defined as the number of incorrect merging in topology inference divided by the total number of merging.

Graph distance: defined as the minimum number of primitive operations (i.e., vertex insertion, vertex deletion and vertex update) that need to be applied to an inferred topology to make it isomorphic with the actual topology. (See, A. N. Papadopoulos et al., "Structure-based similarity search with graph histograms", in *Proc. DEXA '99*, pp. 174-178 (September 1999), which is hereby incorporated by reference herein in its entirety.) This indicates the degree of similarity between two graphs. The smaller the graph distance, the more similar the two graphs are.

Hop gap: the hop gap between a pair of hosts A and B is defined as (1-Hop(A,B) in the inferred topology/Hop(A, B) in the actual topology). We are interested in the average hop gap among all pairs of hosts.

The ideal and expected inference result is the actual topology, whose router ratio, link ratio and anonymous router ratio are all 1.0, and error merging ratio, graph distance and hop gap are all 0. Given a set of pair-wise traceroutes, the initially inferred topology without any merging has perfect error merging ratio and hop gap but large router/link/anonymous router ratios and graph distance. Isomap merging can reduce router/link/anonymous router ratios and graph distance, but it increases error merging ratio and hop gap. The neighbor matching algorithm further reduces router/link/anonymous router ratios and increases the error merging ratio and hop gap.

Two types of network topologies are used to conduct simulations. Generated topologies: we generate 5 Transit-Stub topologies with Georgia Tech's network topology generator. (See, E. Zegura et al., "How to model an internetwork", in Proc. IEEE INFOCOM '96, pp. 594-602 (March 1996), which is hereby incorporated by reference herein its entirety.) Each topology is a two-layer hierarchy of transit networks (with 8 transit domains, each with 16 randomly-distributed routers) and stub networks (with 256 domains, each with 12 randomly-distributed routers). Each topology contains 3200 routers and about 20000 links. A host is connected to a router with 1 ms delay, while the delays of core links are given by the topology generator. Real Internet topology: we also use a router-level Internet topology from "Internet maps", found at http://www.isi.edu/scan/mercator/maps.html, which is hereby incorporated by reference herein its entirety, obtained by the Mercator project and Lucent Bell Lab in November 1999. This topology contains 284,805 routers and 860,683 links. However, it only keeps connectivity information and does not record router-level delays.

Pair-wise traceroutes are conducted in the simulations and shortest-path routing is used to identify a path between a pair of hosts. As discussed above, type-2 anonymous routers can be easily detected while type-3 anonymous routers cannot be well managed using end-to-end measurements. The simulations therefore focus on type-1 anonymous routers. Simulations on the topologies are conducted as follows. For the generated topologies, a number of routers (25-200) are selected randomly and one host is attached to each of them. Some routers are randomly set to be anonymous. Five simulations are conducted on each topology and the results are averaged. For the real Internet topology, 100 hosts are randomly attached to routers and anonymous routers are randomly set as above. Twenty-five simulations are performed and the results are averaged. In the simulations, good results are obtained if $\Delta_1$ and $\Delta_2$ in the Isomap-delay algorithm are set to 10 ms and 30 ms, respectively. In the Isomap-hop algorithm, it is good to set them to 0.05 and 0.2, respectively.

FIG. 7 shows the performance of the merging algorithms on the generated GT-ITM topologies. Group size indicates the total number of hosts in a session. We randomly set 5% routers to be type-1 anonymous routers. The lines labeled "Init" and "Pruning" indicate results on the initially inferred topology and the topology after pruning, respectively. In FIG. 7(a), we clearly see that there is high router inflation. Router ratio without merging increases with the group size. Simple pruning can significantly reduce the inflation, but the residual router ratio is still rather high. The three merging algorithms further reduce the router ratio to close to 1. Note that in all the three algorithms, the router ratio only increases slowly with the group size which shows that these algorithms are efficient even in a large-scale network. Among them, neighbor matching merges the most anonymous routers while Isomap-hop merges the least. In fact, some of the values of neighbor matching are less than 1, which shows that it is too aggressive in merging and tends to over-merge routers. FIGS. 7(b) and (c) show the link ratio and anonymous router ratio, respectively. A Again it can be seen that there is very high inflation, especially for the anonymous router ratio. In FIG. 7(c), with the merging algorithms, anonymous router ratios are reduced to a low value (less than 4). This shows significant improvement as compared to the topology with only pruning.

Figure 7A:
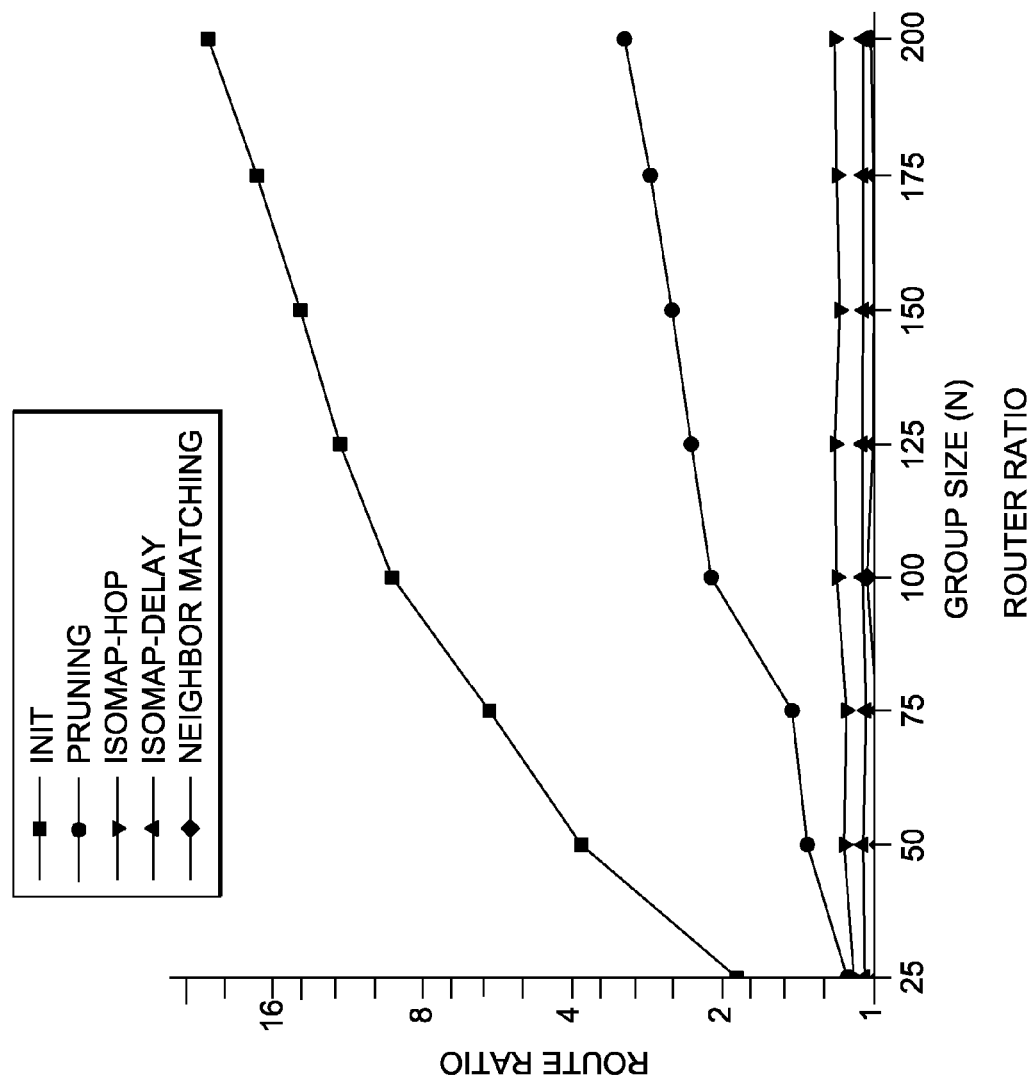
Figure 7B:
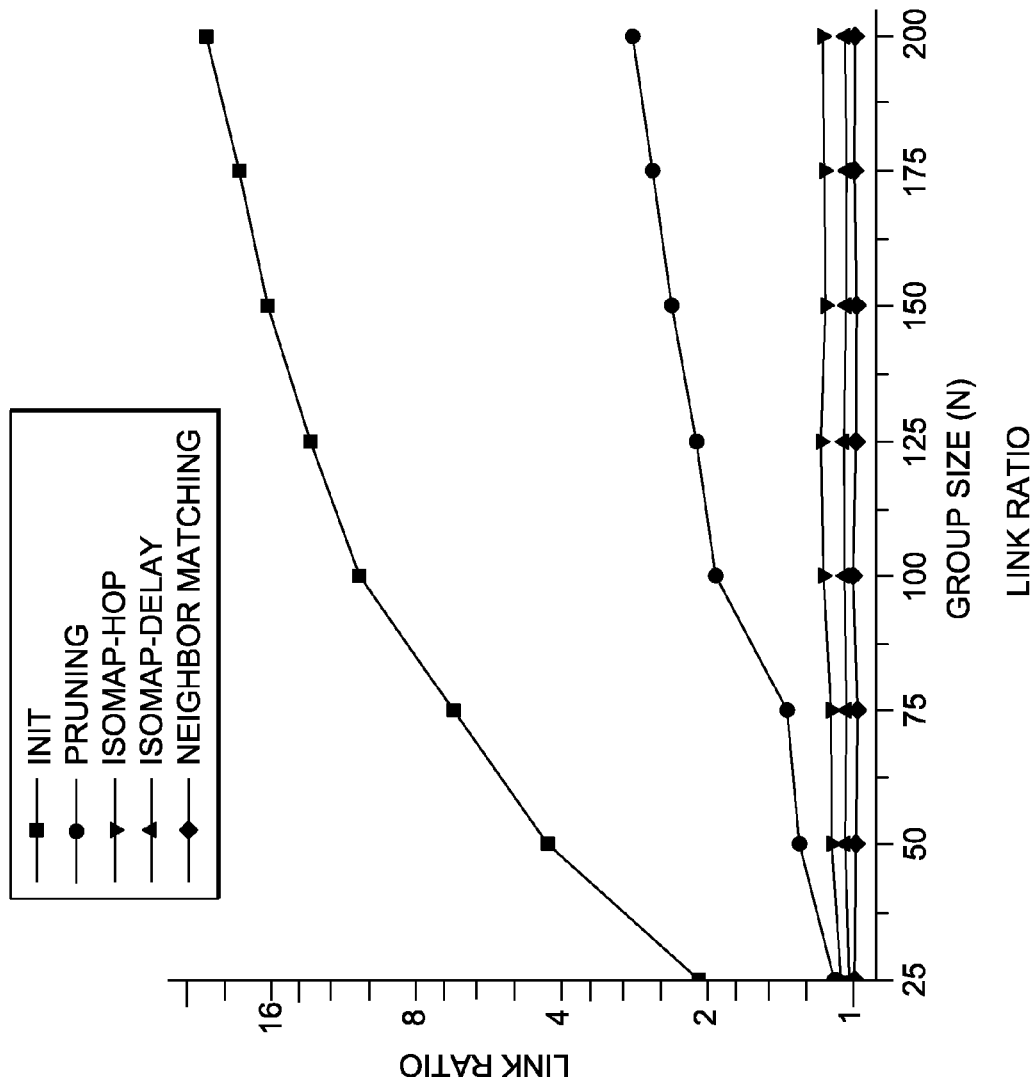
Figure 7C:
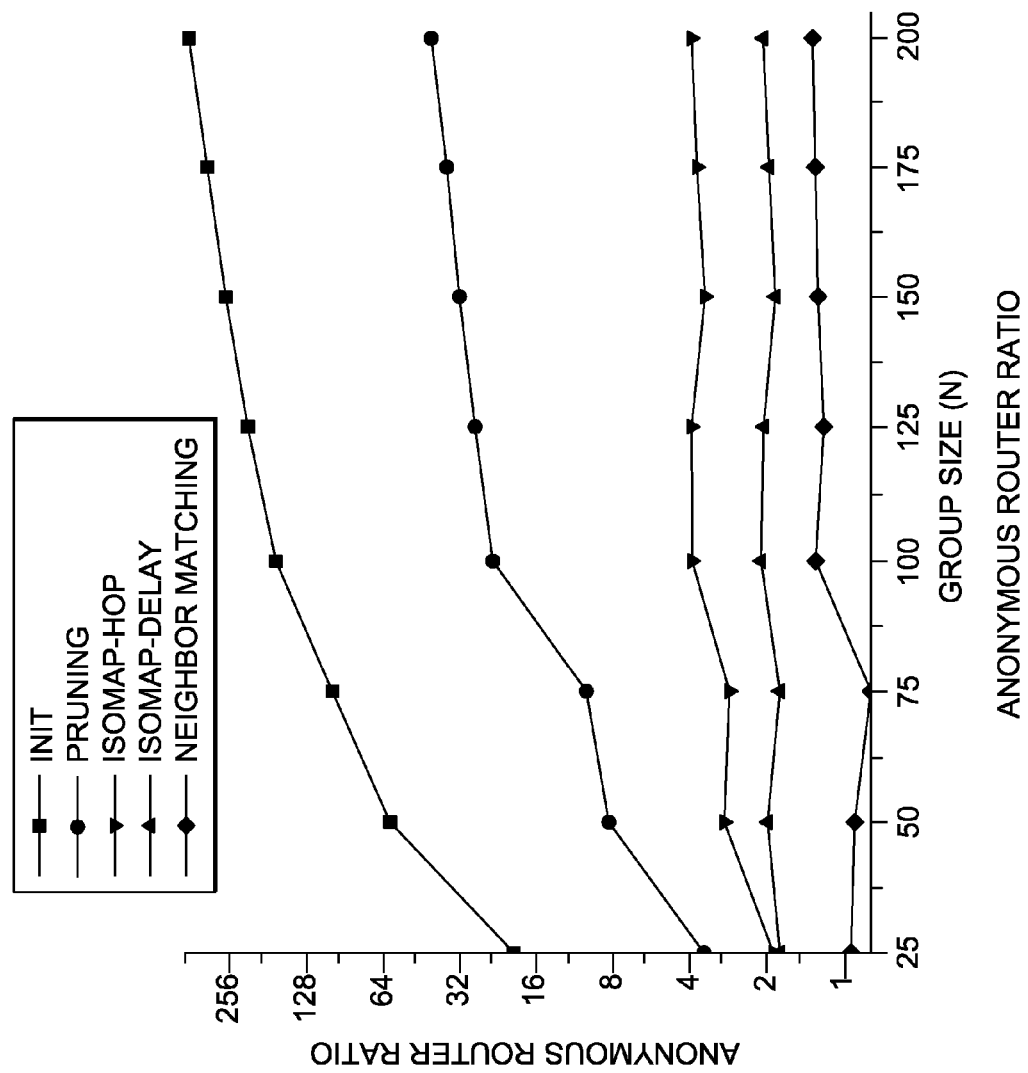
Figure 7D:
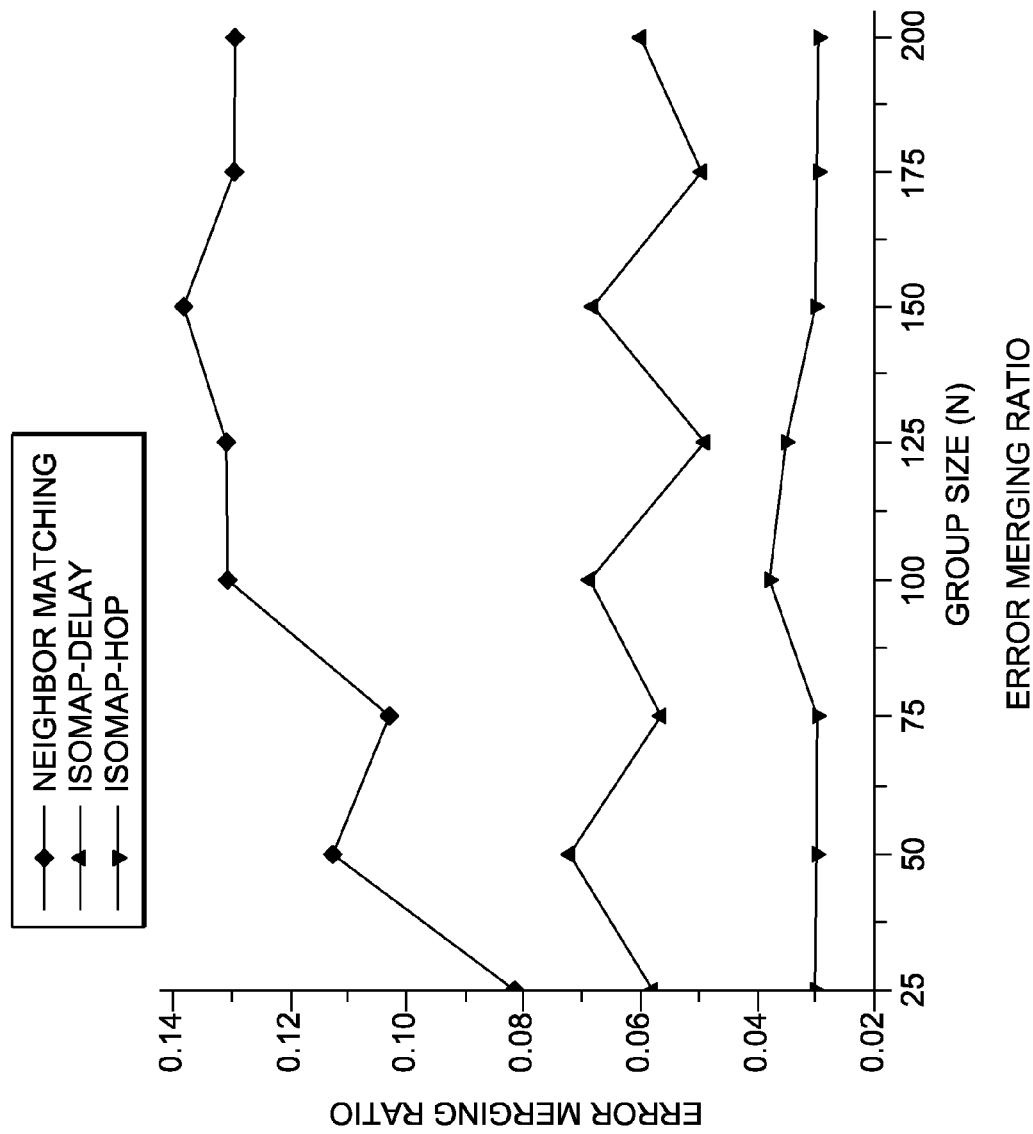
Figure 7E:
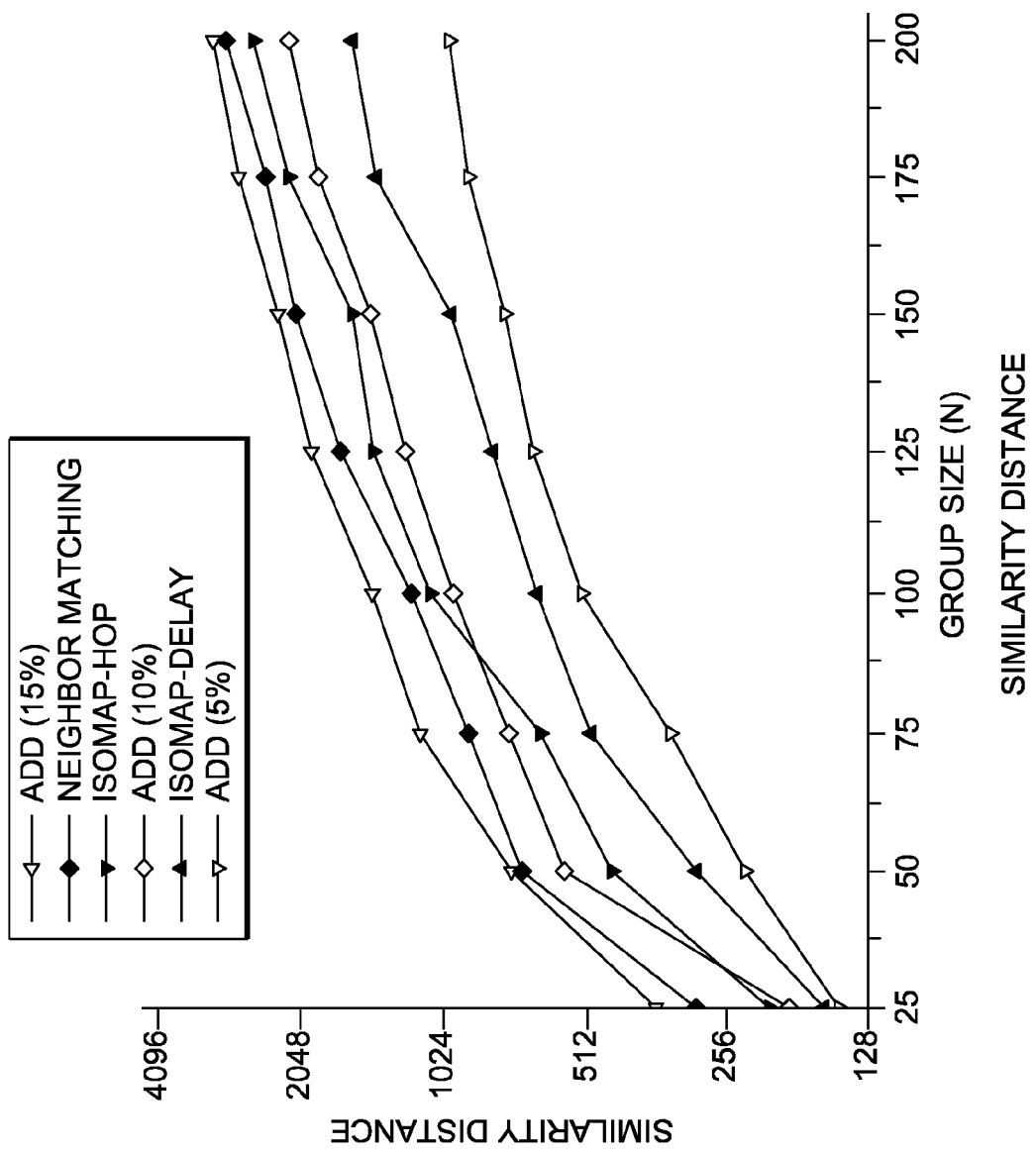
Figure 7F:
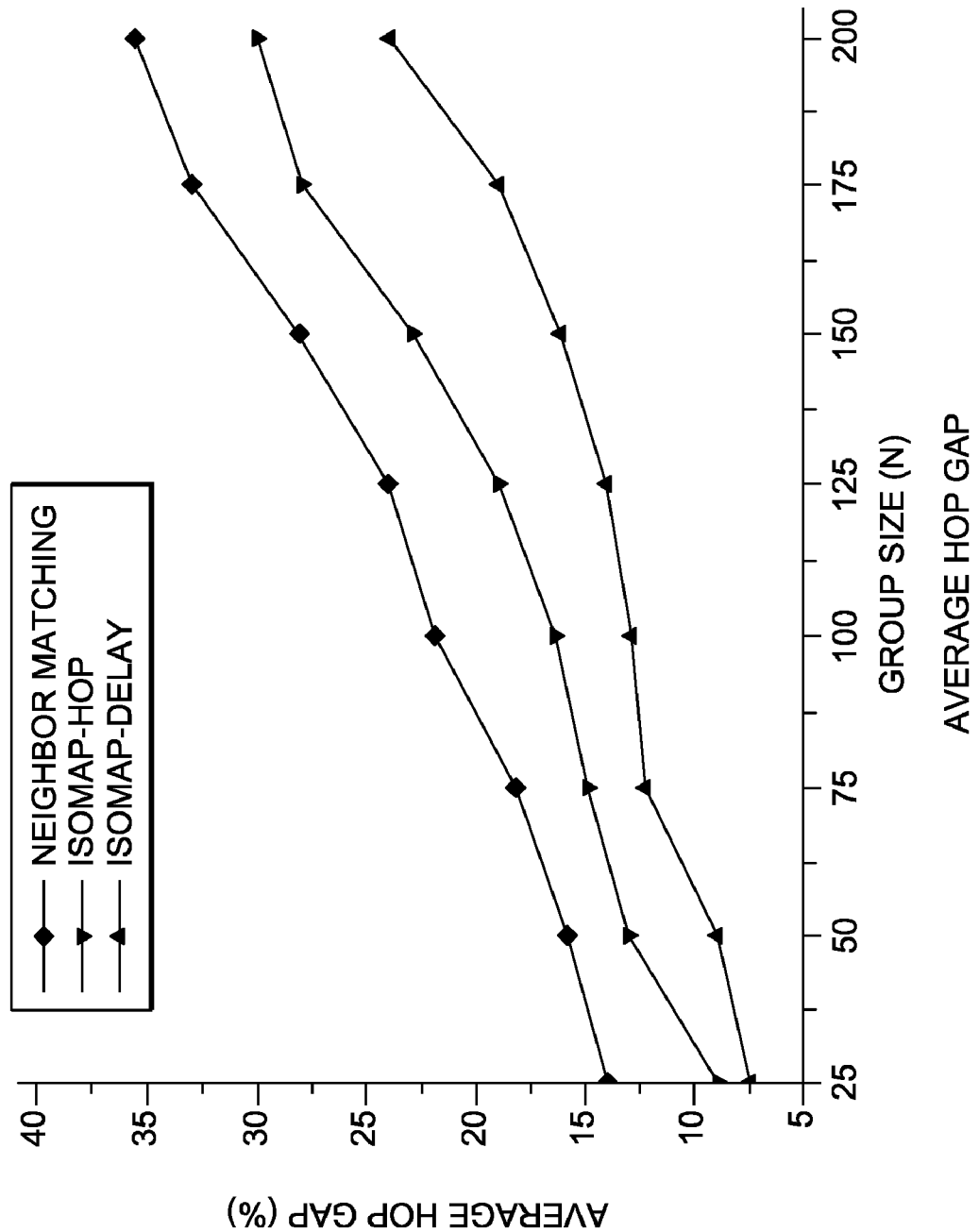

FIG. 7(d) shows the error merging ratios of the three merging algorithms. Note that the error merging ratio for pruning is always 0 in the simulations and hence only the results based on the final inference topologies are shown. This is because shortest path routing is used and the path between any two routers is unique. As shown, neighbor matching has the largest merging error, while Isomap-hop has the smallest. Clearly, neighbor matching aggressively merges anonymous routers and often makes incorrect decisions. Isomap-hop merges the least anonymous routers, leading to the smallest merging error. As for Isomap merging, error merging ratios are less than 8%. This means that most of the merging decisions (more than 92%) are correct.

Figure 8A:
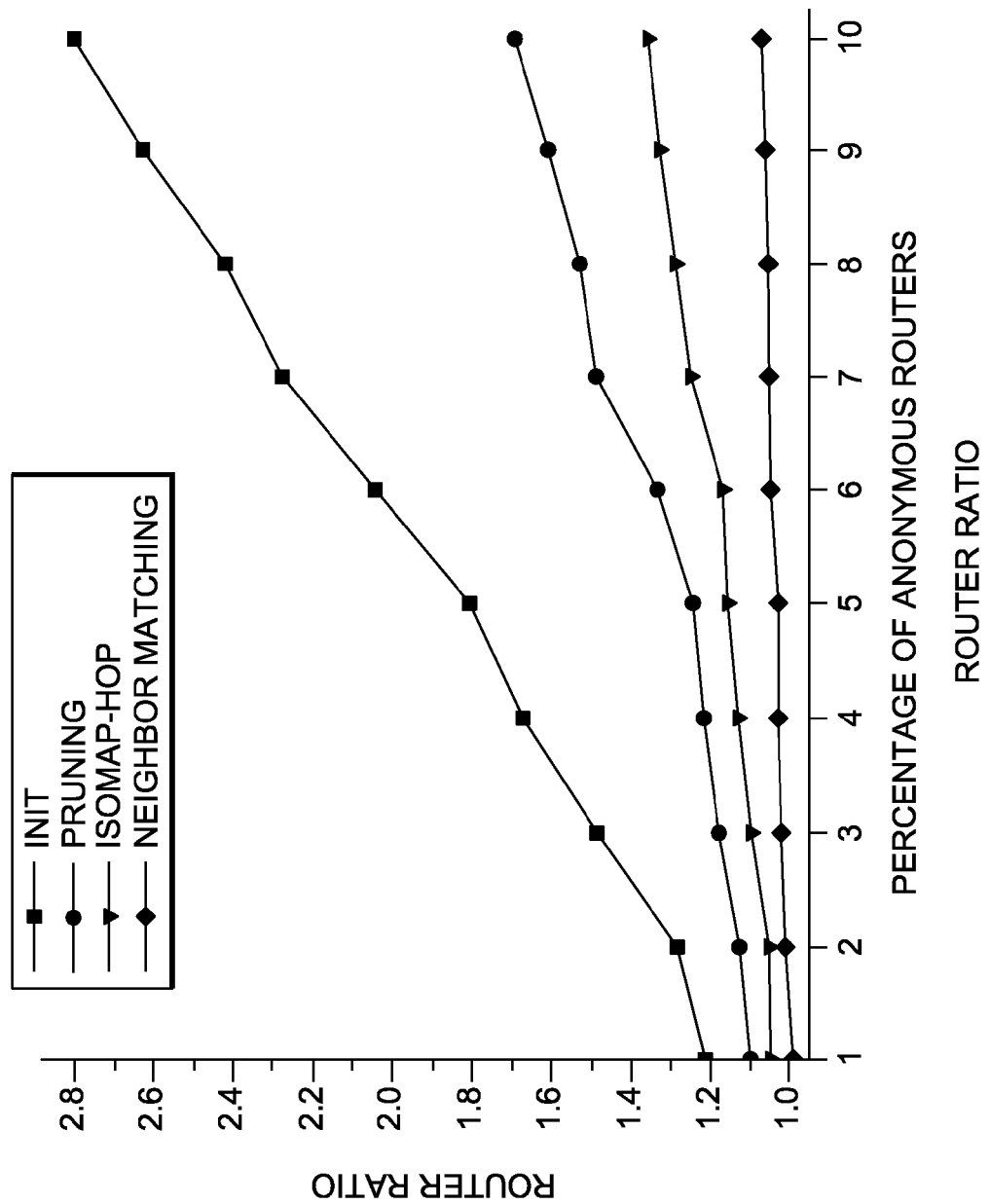
Figure 8B:
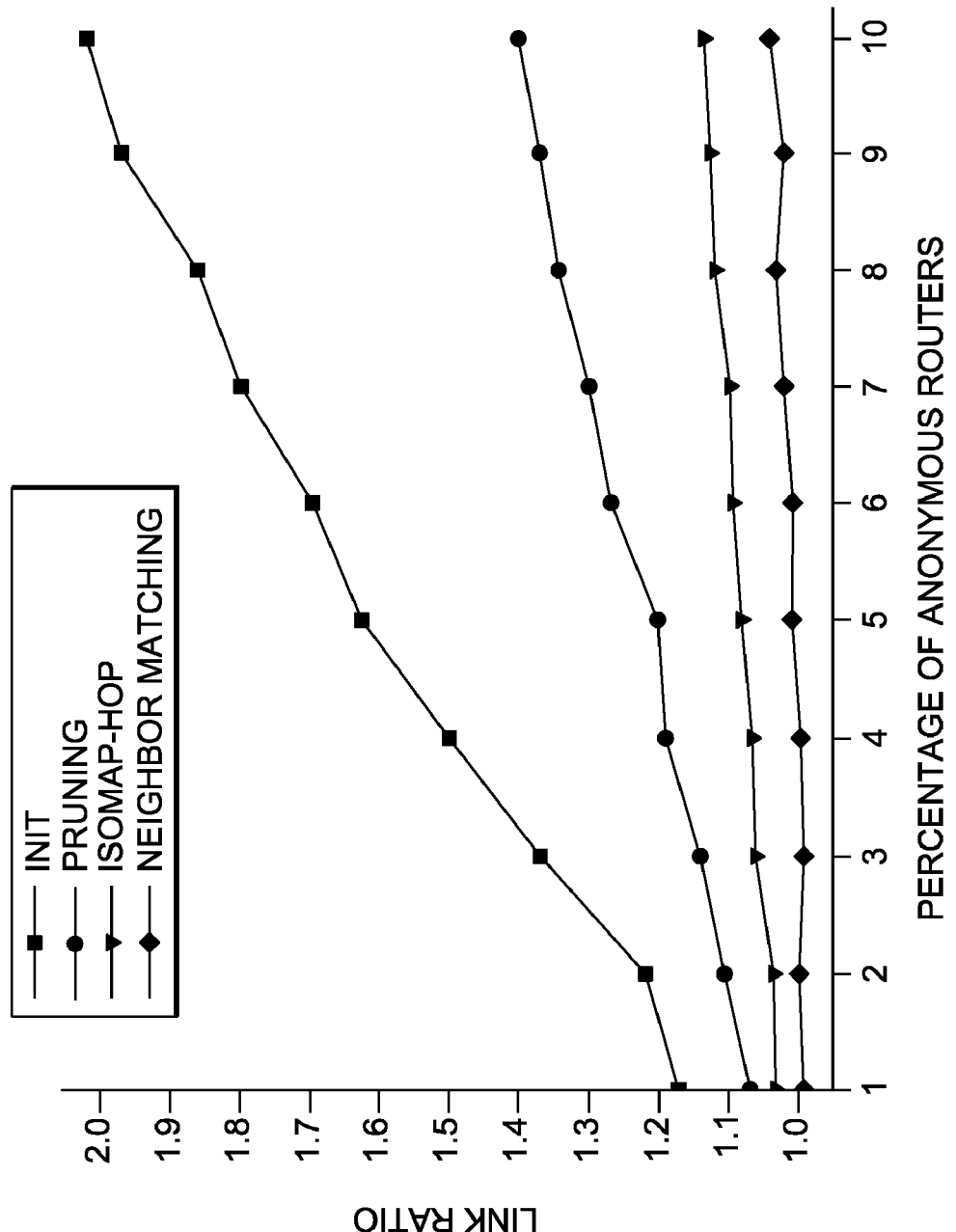
Figure 8C:
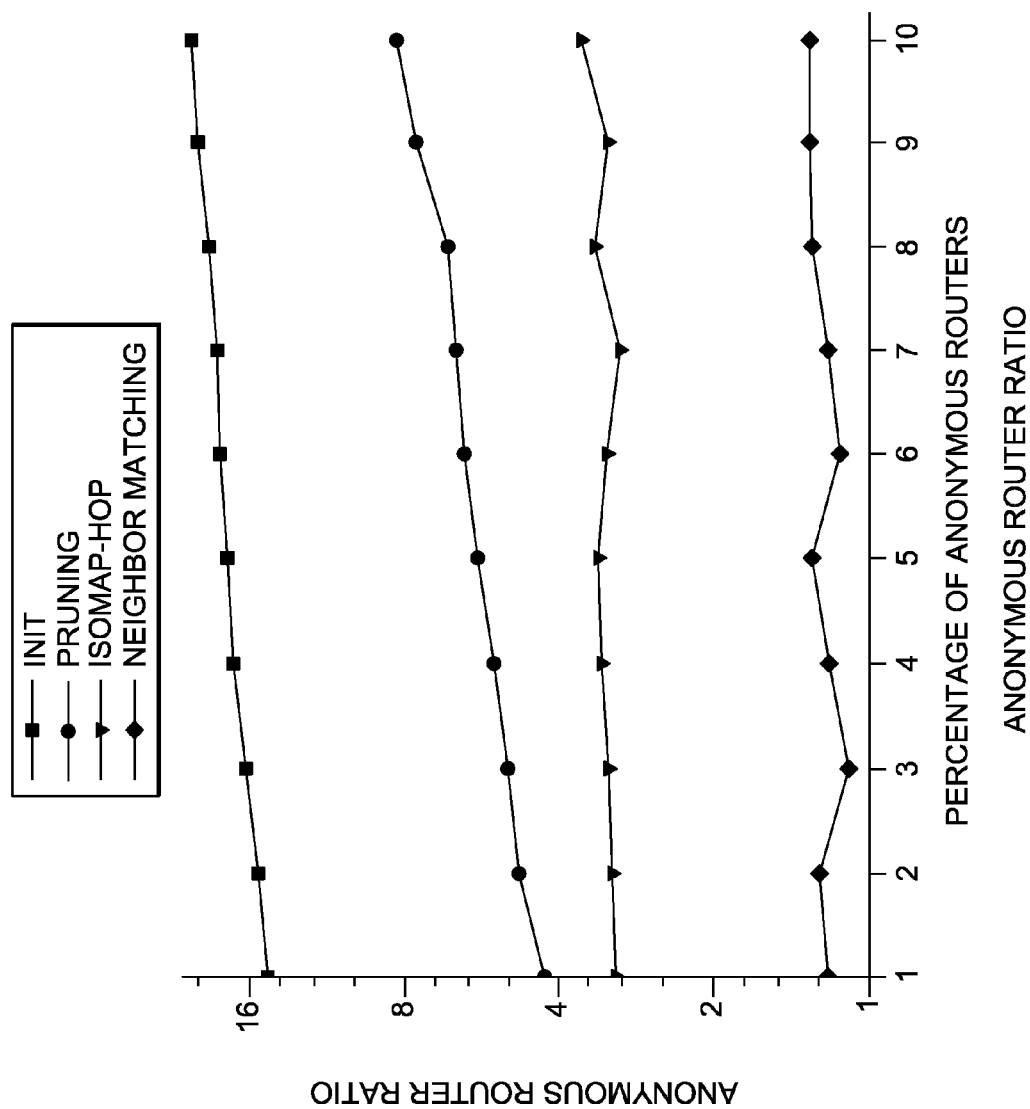
Figure 8D:
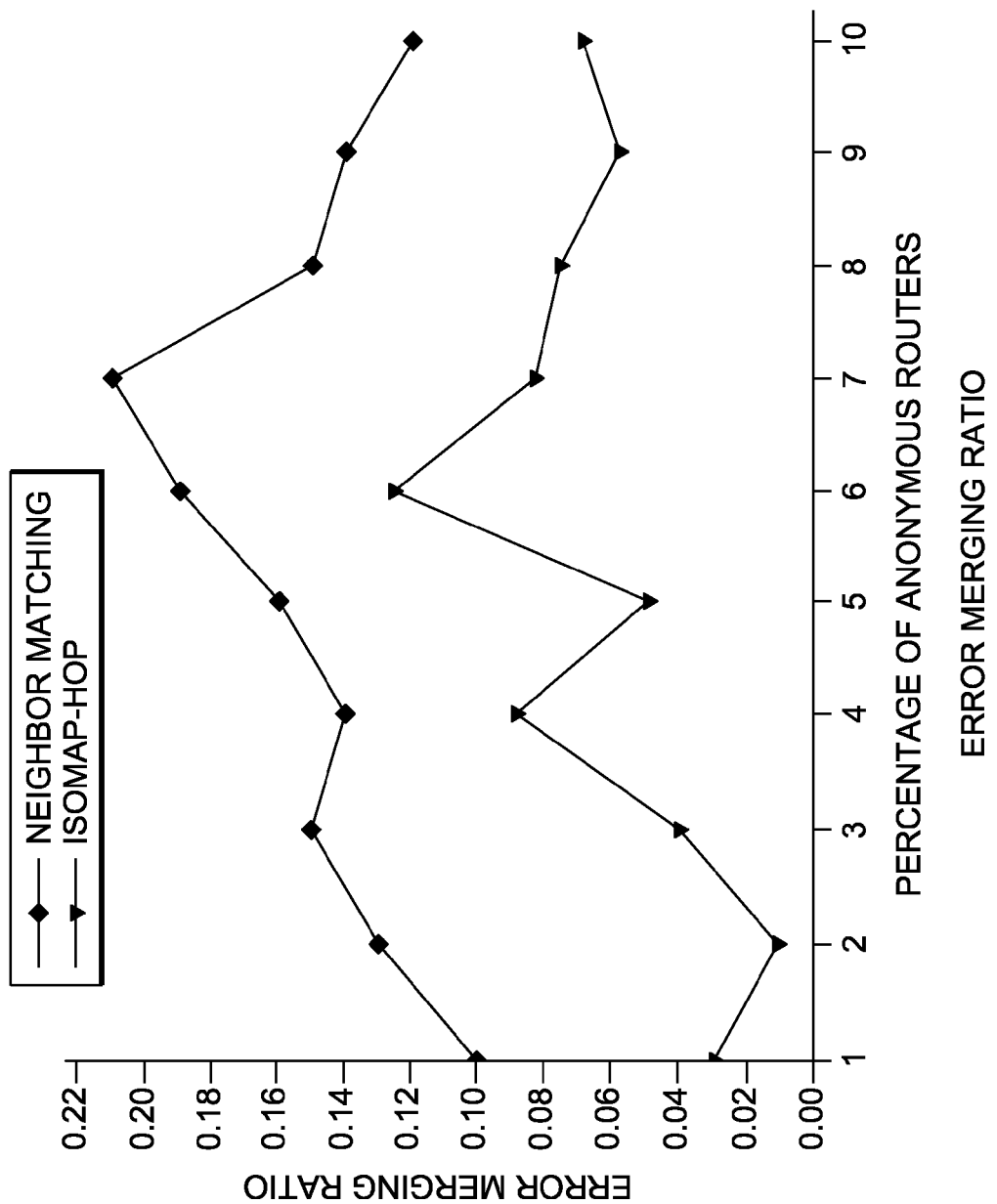
Figure 8E:
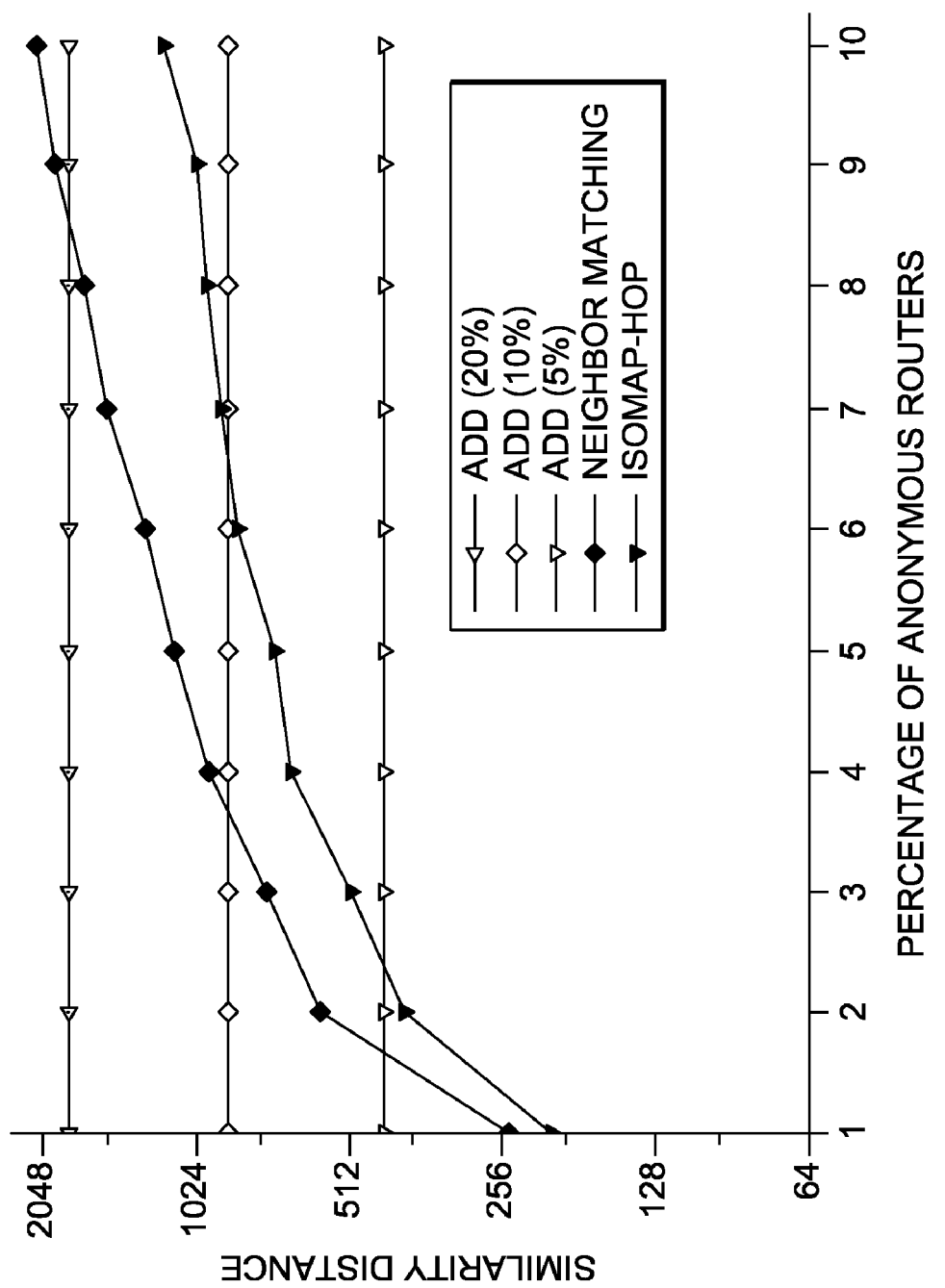

FIG. 8(e) shows the similarity distance between the inferred topology and the actual topology. In the graph, the similarity distance between the actual topology and a topology generated by randomly adding a certain percentage of links is also shown. As the group size increases, the similarity distances all increase, mainly due to higher inflation. Among all the three inferred topologies, Isomap-delay is the most similar to the actual topology, followed by Isomap-hop and then neighbor matching. Isomap-delay achieves a topology very close to the actual one (similar to the topology with about 5% additional links). Isomap-hop also performs similarly to the one with 10% additional links.

Figure 8F:
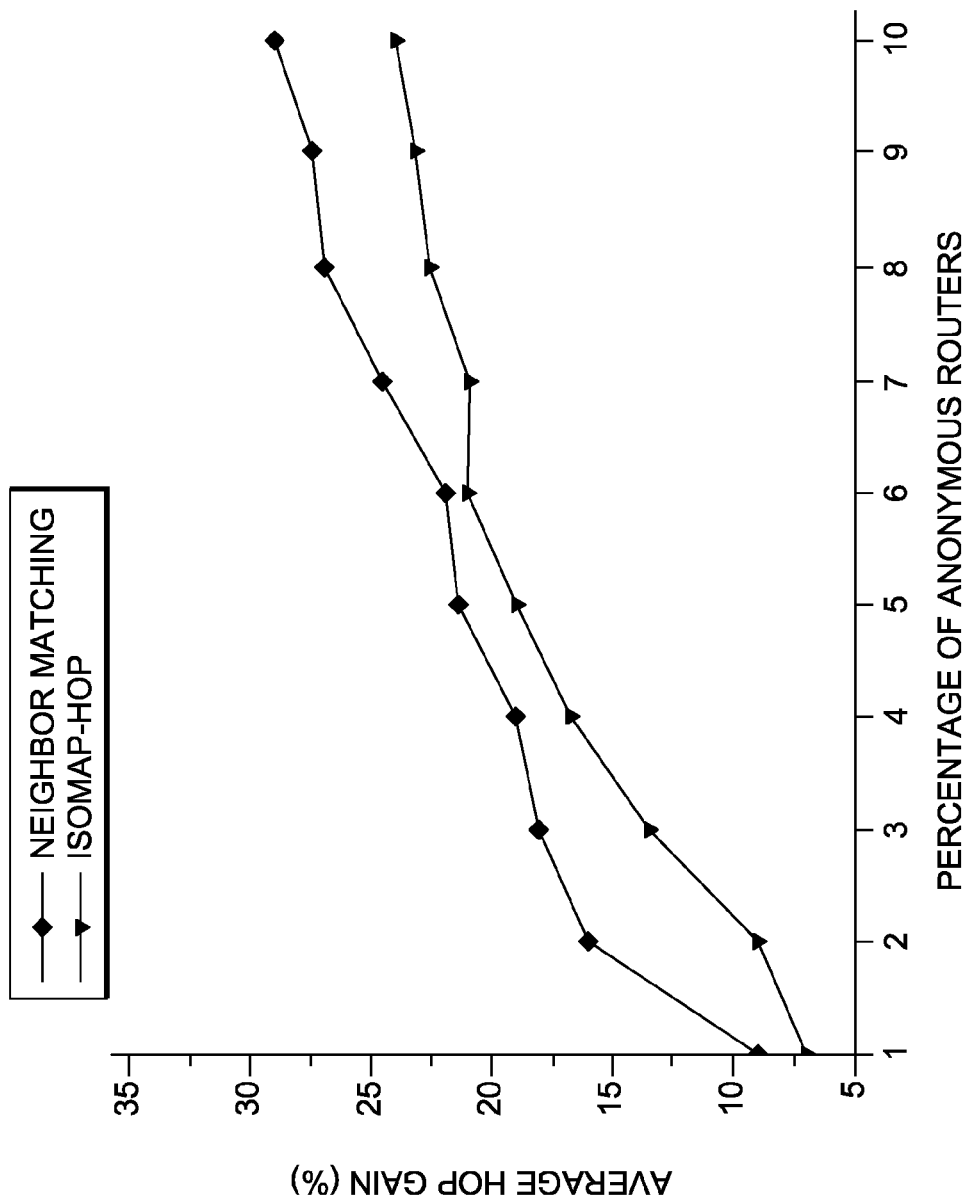

FIG. 8(f) shows the average hop gap of the three topologies. Isomap-delay performs the best while neighbor matching performs the worst. All of them achieve a relatively low average hop gap (less than 40%). It is not expected that the performance of most overlay applications would be sensitive to such a discrepancy.

In summary, the simplest neighbor matching algorithm tends to over-merge routers and hence introduces the highest error. Isomap-delay achieves better performance by its higher complexity. It also performs better than Isomap-hop for most of the metrics considered. This is because Isomap works the best on Euclidean distances among points, but Isomap-hop only uses 0/1 hop values, which introduces error in the fitting of routers to a high-dimensional space. However, in some other networks where delay information is not stable and accurate, Isomap-hop is more useful and applicable.

Due to the lack of round-trip time among routers, the Isomap-delay algorithm is not evaluated on the real Internet topology. Instead, the performance of the other two algorithms is evaluated with a different number of anonymous routers. Their performance is shown in FIG. 8. Clearly, the conclusions are qualitatively the same as that of the generated topologies. The anonymous routers significantly inflate the network. Simple pruning can efficiently reduce the inflation. Isomap-hop and neighbor matching algorithms make further reductions. Neighbor matching merges more anonymous routers than Isomap-hop, but it also makes more mistakes by showing larger error merging ratio, similarity distance and average hop gap.

Comparing FIGS. 7(d) and 8(d), it can be seen that the error merging ratios on the real Internet topology are larger than those on the generated topologies. One reason is that the total number of routers in the real Internet topology is much larger than that in the generated topologies. Note that routers have been randomly selected to attach hosts and shortest path routing has been used to identify inter-host paths. With a huge amount of routers in the real Internet topology, the shortest paths have few overlaps. This is different from the case on the generated topologies, where routers in the core are more frequently visited than others. This also explains why the "Init" and "Pruning" curves in FIGS. 8(a), (b) and (c) have much smaller inflation ratios than that in FIG. 7.

In FIGS. 8(e) and (f), the similarity distance and average hop gap almost linearly increase with the percentage of anonymous routers. When the percentage of anonymous routers is large (say, larger than 7%), the merging error is also large. In that case, application-layer inference may not be sufficient to obtain a highly accurate topology, and more information about anonymous routers is desired.

The algorithms described above have a number of practical applications. The inferred topology can be applied in many overlay network services. A typical example is a peer-to-peer streaming service. With an inferred topology, the streaming service can reduce end-to-end delay and bandwidth consumption and thus provide better streaming quality. The stage at which the topology inference is carried out may depend on the specific application. In some applications peers may dynamically join and leave and in order to obtain the latest topology information continuous (or periodic) topology inference is required. In other cases, for example when peers and networks are relatively stable, the topology inference may be carried out only once.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A method, comprising:
    estimating, by an apparatus, coordinates of a plurality of anonymous routers of a network in a multi-dimensional space, the network having a number of hosts and routers, known or anonymous, using path information collected between the hosts, wherein respective ones of the plurality of anonymous routers have at least internet protocol (IP) address unknown to the apparatus;
    inferring, by the apparatus, a topology of the network, using at least the estimated coordinates of the plurality of anonymous routers; and
    simplifying the topology of the network, by the apparatus, by merging selected ones of the anonymous routers with other anonymous routers or known routers into one or more groups, treating each of the groups as one router, anonymous or known, wherein said selected ones of the anonymous routers are based on distances between the anonymous routers, between the anonymous routers and the known routers, or between the anonymous routers and the hosts.

2. The method as claimed in claim 1, wherein said estimating comprises collecting the path information using a route tracing tool, and logically placing the anonymous routers, the known routers, and the hosts in a high-dimensional Euclidean space using the collected path information.

3. The method as claimed in claim 2, wherein the collected path information includes round-trip delays between the hosts defined in terms of round-trip time.

4. The method as claimed in claim 3, wherein the anonymous routers on a path between two known routers, two known hosts or a known router and a host are assumed to be evenly distributed on the path.

5. The method as claimed in claim 2, wherein the collected path information includes round-trip delays between the hosts defined in terms of hop numbers.

6. The method as claimed in claim 1, further comprising prior to said estimating coordinates, merging one or more of the anonymous routers with one or more other anonymous routers or known routers to reduce the number of anonymous routers.

7. The method as claimed in claim 1, wherein said merging comprises merging two anonymous routers if the two anonymous routers are within a predefined distance of each other and are not on the same path.

8. The method as claimed in claim 1, wherein said merging comprises merging two anonymous routers if the two routers share a common known router or host neighbor, within a predefined distance of each other and are not on the same path.

9. The method of claim 1, further comprising providing an application layer service on the network, by the apparatus, using the simplified topology.

10. A method of inferring a topology of a network, comprising:
    estimating, by an apparatus, coordinates of a plurality of anonymous routers of the network in a multi-dimensional space, the network having a number of hosts and routers, known or anonymous, using path information collected between the hosts, wherein respective ones of the plurality of anonymous routers have internet protocol (IP) addresses unknown to the apparatus;
    inferring, by the apparatus, the topology of the network, using at least the estimated coordinates of the plurality of anonymous routers; and
    simplifying the topology of the network, by the apparatus, by merging a pair of anonymous routers of the plurality of anonymous routers of the network that shares at least one known router or host as a neighbor, and by treating the pair of anonymous routers as one anonymous router.

11. The method as claimed in claim 10, further comprising repeating said simplifying iteratively, by the apparatus, until no further anonymous routers can be merged, and be treated as one anonymous router.

12. A method of providing an application layer service, comprising:
    estimating, by an apparatus, coordinates of a plurality of anonymous routers of the network in a multi-dimensional space, the network having a number of hosts and routers, known or anonymous, using path information collected between the hosts, wherein respective ones of the plurality of anonymous routers have internet protocol (IP) addresses unknown to the apparatus;
    inferring, by the apparatus, the topology of the network, using at least the estimated coordinates of the plurality of anonymous routers; and
    providing the application layer service on a network, by the apparatus, using a topology wherein a pair of anonymous routers of the plurality of anonymous routers of the network that shares at least one known router or host as a neighbor is merged and considered as one anonymous router.

13. The method as claimed in claim 12, further comprising generating the topology, by the apparatus, by performing said merging iteratively until no further ,anonymous routers can be merged, and be treated as one anonymous router.

14. An apparatus, comprising:
logic configured to cause the apparatus, in response to operation of the logic by the apparatus, to perform operations including:
estimating coordinates of a plurality of anonymous routers of a network in a multi-dimensional space, the network having a number of hosts and routers, known or anonymous, using path information collected between the hosts, wherein respective ones of the plurality of anonymous routers have internet protocol (IP) addresses unknown to the apparatus;
inferring, a topology of the network, using at least the estimated coordinates of the plurality of anonymous routers; and
simplifying the topology of the network by merging selected ones of the anonymous routers with other anonymous routers or known routers into one or more groups, treating each of the groups as one router, anonymous or known, wherein said selected ones of the anonymous routers are based on distances between the anonymous routers, between the anonymous routers and known routers, or between the apparent anonymous routers and the hosts.

15. The apparatus as claimed in claim 14, wherein the operation of estimating comprises collecting the path information using a route tracing tool, and logically placing the anonymous routers, the known routers, and the hosts in a high-dimensional Euclidean space using the collected path information.

16. The apparatus as claimed in claim 14, wherein the anonymous routers on a path between two known routers, two known hosts or a known router and a host are assumed to be evenly distributed on the path.

17. The apparatus as claimed in claim 14, wherein the operations further comprise prior to said estimating coordinates, merging one or more of the anonymous routers with one or more other anonymous routers or known routers to reduce the number of anonymous routers.

18. The apparatus as claimed in claim 14, wherein the operation of merging comprises merging two anonymous routers if the two anonymous routers are within a predefined distance of each other and not on the same path.

19. The apparatus as claimed in claim 14, wherein the operation of merging comprises merging two anonymous routers if the two anonymous routers share a common known router or host neighbor, within a predefined distance of each other and are not on the same path.

* * * * *

UNITED STATES PATENT AND TRADEMARK OFFICE
CERTIFICATE OF CORRECTION

PATENT NO. : 7,889,680 B2  
APPLICATION NO. : 11/850151  
DATED : February 15, 2011  
INVENTOR(S) : Chan et al.

It is certified that error appears in the above-identified patent and that said Letters Patent is hereby corrected as shown below:

Title page, item (57), under "Abstract", in Column 2, Line 2, delete "co-ordinates" and insert -- coordinates --.

Column 11, line 51, in Claim 1, delete "least" and insert -- least one --.

Column 12, line 24, in Claim 8, delete "two routers" and insert -- two anonymous routers --.

Column 12, line 28, in Claim 9, delete "method of" and insert -- method as claimed in --.

Column 13, line 6, in Claim 13, delete "further ,anonymous" and insert -- further anonymous --.

Column 14, line 2, in Claim 14, delete "apparent anonymous" and insert -- anonymous --.

Signed and Sealed this  
Twenty-eighth Day of June, 2011

David J. Kappos  
*Director of the United States Patent and Trademark Office*